United States Patent Office 3,753,860
Patented Aug. 21, 1973

3,753,860
PRESERVATION OF BOVINE STOMACHS
FOR RENNET EXTRACTION
Richard B. Dardas, Gales Ferry, Conn., assignor to
Pfizer Inc., New York, N.Y.
No Drawing. Filed Mar. 2, 1972, Ser. No. 231,418
Int. Cl. C07g 7/026
U.S. Cl. 195—65                                    1 Claim

ABSTRACT OF THE DISCLOSURE

High recovery yields of rennet are obtained from calf and adult bovine stomachs preserved by dipping the stomachs in a 1 to 10% w./v. propylene glycol solution of a 1:1 mixture of the methyl and propyl esters of p-hydroxybenzoic acid, and storing under refrigeration.

BACKGROUND OF THE INVENTION

In the cheese industry, the term rennet generally refers to a brined extract of calf stomachs used to coagulate milk for cheese production. In general usage, any milk-clotting enzyme preparation yielding a relatively stable curd is designated a rennet (or rennin, if pure).

The preponderant proportion of cheese produced on a commercial scale is made from cows' milk. In practice, rennet is added to prepared milk to cause coagulation of casein and consequent curd formation. The curd is then treated further to yield a cheese whose type is determined by the nature of the processing employed. The production of rennet and its use in milk-clotting are described in Methods in Enzymology; Kolwick and Kaplan, Academic Press; Advances in Enzymology, 15, 423–448 (1954); Compt. Rend. Trav. Lab. Carlsberg, 35, No. 8, 143–166 (1966); U.S. Pat. 2,339,931; U.S. Pat. 2,337,947 and French Pat. 994,082.

Calf rennet remains the industry standard against which other coagulants are measured. However, decling calf slaughter has resulted in a world-wide shortage of stomach raw materials for rennet production. This is reflected in the growing use of adult bovine stomachs with their lower rennet content, and processes for increasing the recoverable yield of rennet from these tissues.

Packing in rock salt or sodium chloride crystals is a traditional method for meat preservation and prevention of microbial growth. In the present practice of rennet production, it is customary to wash the calf and adult bovine stomachs with water immediately after slaughter and pack them in solid sodium chloride prior to storage under refrigeration. The rennet is subsequently extracted from the tissues with water or 5–10% w./v. sodium chloride solution.

This invention is concerned with a method for the preservation and storage of calf and adult bovine stomachs which allows higher yields of rennet than that obtained with presently used solid sodium chloride.

SUMMARY OF THE INVENTION

This invention is concerned with a method for the preservation of calf and adult bovine stomachs under storage for subsequent extraction of rennet. It has been found that dipping these stomachs in a 1 to 10% w./v. propylene glycol solution of a 1:1 mixture of the methyl and propyl esters of p-hydroxybenzoic acid prior to storage under refrigeration allows for increased yields of extracted rennet of 50% or more than presently used solid sodium chloride.

DETAILED DESCRIPTION OF THE INVENTION

It has been found that dipping the complete surfaces of calf or adult bovine stomachs in a 1 to 10% w./v. propylene glycol solution of a 1:1 mixture of the methyl and propyl esters of p-hydroxybenzoic acid prior to storage under refrigeration allows subsequent extraction yields of rennet at least 50% higher than presently used solid sodium chloride and approximately equal to that obtained from fresh calf and adult bovine stomachs. No explanation can be offered at this time for this unexpected finding.

The choice of esters of p-hydroxybenzoic acid (generically referred to as parabenz) is not critical, and they may be used singly or in combination. The preferred solution is a 1:1 mixture of methyl and propyl parabenz in propylene glycol. Concentrations of the parabenz in propylene glycol may range from 1 to 10% w./v., with 5% w./v. the preferred concentration. Calf and adult bovine stomachs, after slaughter, are washed with water, dipped in the propylene glycol-parabenz solution and stored under refrigeration. The refrigeration temperature is not critical and it may range from as low as 3° C. to as high as 10° C., and that generally, in accordance with custom, a temperature of from 4 to 5° C. is employed.

The preservative solutions are evaluated and compared with solid sodium chloride by placing so-treated bovine stomachs, after intervals of storage under refrigeration, in water or 5 to 10% w./v. sodium chloride solution at a 3:1 ratio of liquid to tissue at a temperature of about 37° C. for approximately 48 hours. This process is repeated for a total of 3 such extractions. The extracts from each stomach are combined, and assayed for rennet by a modification of the milk-clotting assay of C. A. Ernstrom, J. Dairy Science, 41, No. 12, 1664 (1958). The principle of the assay is based on the length of time required for the rennet in solution to clot a known amount of milk, under the test conditions, as compared with a working reference which is expressed in arbitrary rennet units.

The following examples are given by way of illustration and are not to be construed as limitations of this invention, variations of which are possible without departing from the spirit or scope thereof.

EXAMPLE I

Calf stomachs are washed with water immediately after slaughter and set aside under refrigeration (4–5° C.) for approximately 12 hours. Individual stomachs are dipped in 3% w./v. and 5% w./v. propylene glycol solutions of a 1:1 mixture of methyl and propyl parabenz. A control group of stomachs is packed in solid sodium chloride. The preservative treated calf stomachs are then stored under refrigeration (4—5° C.). After a time period of 1 week, 2 weeks and 5 weeks, the individual stomachs are placed in 10% w./v. sodium chloride solution at a 3:1 solution to meat ratio and held at 37° C. for about 48 hours each for a total of 3 such extractions. The extracts from each stomach are combined and assayed for rennet. The results are shown in the following table with the body of the table expressed in arbitrary rennet units per gram of tissue.

| Preservative | Storage time (weeks) | | |
|---|---|---|---|
| | 1 | 2 | 5 |
| Sodium chloride | 90 | 55 | 54 |
| 3% parabenz | 83 | 89 | 88 |
| 5% parabenz | 104 | 111 | 121 |

EXAMPLE II

Adult bovine stomachs are washed with water immediately after slaughter, and individual stomachs are dipped in 1% w./v., 5% w./v. propylene glycol solutions of a 1:1 mixture of methyl and propyl parabenz. A control group of stomachs is packed in solid sodium chloride. After time periods of 1 week, 2 weeks and 4 weeks storage under refrigeration (4–5° C.), individual stomachs are placed in water at a 3:1 ratio of water to meat and held at 37° C. for about 48 hours for a total of 3 such extractions. The extracts from each stomach are combined, and assayed for rennet. The results are shown in the following table with the body of the table expressed in arbitrary rennet units per gram of tissue.

| Preservative | Storage time (weeks) | | |
|---|---|---|---|
| | 1 | 2 | 5 |
| Sodium chloride | 17 | 10 | 27 |
| 1% parabenz | 27 | | 32 |
| 5% parabenz | 51 | 63 | 67 |
| 10% parabenz | 34 | 40 | 54 |

What is claimed is:

1. In the method for preserving calf and adult bovine stomachs for subsequent rennet extraction by treatment of said stomachs with a preserving agent, then storing the treated stomachs under refrigeration, and subsequently obtaining rennet from said treated stomachs, the improvement which comprises dipping said stomachs in a 1 to 10% w./v. solution of a 1:1 mixture of the methyl and propyl esters of p-hydroxybenzoic acid in propylene glycol prior to storage under refrigeration.

References Cited

UNITED STATES PATENTS 3,281,332 10/1966 Munns et al. _____ 195—66 R
2,177,519 10/1939 Doyle _____ 99—157
2,933,399 4/1960 Nickerson et al. _____ 99—222

LIONEL M. SHAPIRO, Primary Examiner

U.S. Cl. X.R.

195—66 R